(12) United States Patent
Mori et al.

(10) Patent No.: US 7,645,111 B2
(45) Date of Patent: Jan. 12, 2010

(54) SYSTEM FOR PUTTING GLASS PLATES TO TARGET POSITIONS

(75) Inventors: Takeshi Mori, Mie (JP); Tomoki Matsuba, Mie (JP); Takashi Ushirone, Mie (JP)

(73) Assignee: Central Glass Company, Limited, Ube-shi (JP)

( * ) Notice: Subject to any disclaimer, the term of this patent is extended or adjusted under 35 U.S.C. 154(b) by 232 days.

(21) Appl. No.: 10/876,655

(22) Filed: Jun. 28, 2004

(65) Prior Publication Data

US 2004/0240972 A1 Dec. 2, 2004

(30) Foreign Application Priority Data

| Nov. 5, 2002 | (JP) | 2002-321467 |
| Nov. 18, 2002 | (JP) | 2002-334252 |
| Feb. 3, 2003 | (JP) | 2003-026474 |
| Mar. 16, 2004 | (JP) | 2004-073712 |

(51) Int. Cl.
B65G 35/00 (2006.01)
B65H 3/08 (2006.01)
B65G 25/00 (2006.01)
B23P 19/00 (2006.01)
B65H 29/24 (2006.01)
G05B 15/00 (2006.01)

(52) U.S. Cl. ............... 414/676; 198/721; 198/722; 65/182.2; 414/797; 414/754; 414/780; 29/740; 271/195; 700/258

(58) Field of Classification Search ........... 414/676, 414/222.01, 222.12, 774, 775, 781, 797; 901/40; 700/262; 83/277, 418, 419, 420, 83/421; 294/64.1; 198/416, 689.1, 721, 198/725; 269/1; 271/195; 65/182.2

See application file for complete search history.

(56) References Cited

U.S. PATENT DOCUMENTS

| 3,399,042 | A | * | 8/1968 | McMaster et al. ............ 65/25.4 |
| 3,469,887 | A | * | 9/1969 | Toyoda Yoichi et al. .... 104/23.2 |
| 3,473,910 | A | | 10/1969 | Wilde et al. |
| 3,594,149 | A | * | 7/1971 | Pickavance et al. ........ 65/182.2 |
| 4,228,993 | A | * | 10/1980 | Cathers ...................... 271/236 |
| 4,297,927 | A | * | 11/1981 | Kuroda .......................... 83/36 |
| 4,316,628 | A | * | 2/1982 | Farmer et al. .............. 294/64.1 |

(Continued)

FOREIGN PATENT DOCUMENTS

EP 0 136 432 A1 4/1985

(Continued)

*Primary Examiner*—Gregory W Adams
(74) *Attorney, Agent, or Firm*—Crowell & Moring LLP

(57) ABSTRACT

A method for putting a glass plate to a target position includes (a) putting the glass plate at a preliminary position above an air table that discharges air upwardly, by moving a suction member that supports the glass plate through suction; (b) releasing suction of the suction member, while air is discharged upwardly from the air table, thereby floating the glass plate at the preliminary position above the air table; and (c) moving a pressing member in a horizontal direction, while the pressing member is in abutment with a top surface of the glass plate and while air is discharged upwardly from the air table, thereby moving the glass plate in the horizontal direction from the preliminary position above the air table to the target position above the air table by a frictional force generated between the pressing member and the glass plate.

12 Claims, 11 Drawing Sheets

U.S. PATENT DOCUMENTS

| | | | | |
|---|---|---|---|---|
| 4,743,159 | A | * 5/1988 | Inamori | 414/737 |
| 4,790,584 | A | * 12/1988 | Prentakis | 294/1.1 |
| 4,894,788 | A | * 1/1990 | Stelzer | 700/262 |
| 5,033,730 | A | * 7/1991 | Davies et al. | 271/106 |
| 5,173,029 | A | * 12/1992 | Delventhal et al. | 414/754 |
| 5,173,148 | A | 12/1992 | Lisec | |
| 5,271,706 | A | * 12/1993 | Helbach et al. | 414/676 |
| 6,666,122 | B2 | * 12/2003 | Raney et al. | 83/451 |
| 2004/0240972 | A1 | 12/2004 | Mori et al. | |

FOREIGN PATENT DOCUMENTS

| | | | |
|---|---|---|---|
| EP | 0 642 998 A2 | | 3/1995 |
| JP | 2-43143 A | | 2/1990 |
| JP | 2043143 | | 2/1990 |
| JP | 02130849 A | * | 5/1990 |
| JP | 5-82941 | | 11/1993 |
| JP | 6-247594 A | | 9/1994 |
| JP | 6247594 | | 9/1994 |
| JP | 7061597 | | 3/1995 |
| JP | 7315570 | | 12/1995 |
| JP | 11035150 | | 2/1999 |
| JP | 2000296435 | | 10/2000 |
| JP | 2001-358206 A | | 12/2001 |
| JP | 2004-238104 A | | 8/2004 |

* cited by examiner

SYSTEM FOR PUTTING GLASS PLATES TO TARGET POSITIONS

BACKGROUND OF THE INVENTION

The present invention relates to a system for putting plate members (e.g., glass plates) to target positions, particularly to a system for automatically supplying glass plates (standing in a pallet) one by one with high speed into a bending furnace (equipped with hearth beds) in the production of curved glass plates for vehicular and industrial uses.

In the case of bending window glasses for vehicles such as automobiles, it is possible to use various bending methods depending on dimensions and shapes of glass plates. In particular, in the case of producing automotive side window glasses, it is common to use a bending furnace with hearth beds due to its very high productivity.

It is necessary to supply glass plates into such bending furnace by taking a first glass plate positioned at the forefront of glass plates standing in a pallet etc. and then by putting the first glass plate on a conveyor table in a manner to bring the first glass plate into abutment with flights (positioning guides), which are fixed to and driven by a conveyor chain. With this, the first glass plate floating over the conveyor table is guided into the bending furnace by the flights.

Due to very high productivity of a bending furnace with hearth beds, it is necessary to supply glass plates one by one with high speed into the bending furnace, too. This, however, involves some difficulties. For example, when a first glass plate positioned at the forefront of glass plates standing in a pallet etc. is taken with high speed, a second glass plate next to the first glass plate may also be pulled by the first glass plate, due to a temporary reduced pressure between the first and second glass plates. This phenomena "blocking" must be suppressed in order to achieve a high-speed supply of glass plates one by one into the bending furnace. Furthermore, it is necessary to conduct positioning of each glass plate in order to accurately bring each glass plate into abutment with flights.

Japanese Patent Publication JP-A-7-61597 discloses an apparatus for transferring glass plates (standing in a pallet) one by one. This apparatus is equipped with a mechanism for removing each interleaf paper between two glass plates.

Japanese Patent Publication JP-A-11-35150 discloses an apparatus for taking glass plates one by one to safely introduce glass plates into a glass cutting machine, etc.

Japanese Patent Publication JP-A-2000-296435 discloses a method for positioning glass plates with shapes other than rectangle.

Japanese Patent Publication JP-A-6-247594 discloses an apparatus for positioning glass plates with shapes other than rectangle.

Japanese Utility Model Publication JP-U-5-82941 discloses an apparatus for transferring glass plates one by one. This apparatus has a frame, suction cups formed on the frame, and a reference sensor and two additional sensors. These three sensors are disposed at three apexes of a triangle and serve to adjust the angle of the frame relative to a glass plate that is positioned at the forefront of the glass plates.

Japanese Patent Publication JP-A-2-43143 discloses a robotic suction hand for transferring plate members one by one by applying suction.

Japanese Patent Publication JP-A-7-315570 discloses an apparatus for separating a first glass plate at the top of a pile of glass plates from a second glass plate next to the first glass plate by ejecting compressed air.

SUMMARY OF THE INVENTION

It is an object of the present invention to provide a system for automatically supplying glass plates one by one with high speed into a bending furnace.

It is another object of the present invention to provide a method and an apparatus for putting a glass plate to a target position by bringing the glass plate into abutment with a flight (a positioning guide) having play.

It is still another object of the present invention to provide a robot and a method for easily transferring standing plate members one by one with high speed.

According to a first aspect of the present invention, there is provided a system for automatically supplying glass plates into a bending furnace. This system comprises:

(a) a first transfer means that is capable of transferring a first glass plate positioned at a forefront of glass plates standing in a pallet, onto a positioning table, by supporting the first glass plate with a suction member of the first transfer means;

(b) a detecting means for detecting a real coordinate of the first glass plate on the positioning table; and (c) a second transfer means for transferring the first glass plate from the positioning table to a target position on a conveyance table, while a position of the first glass plate is corrected based on a difference between the real coordinate and a reference coordinate of the first glass plate on the positioning table, wherein a first transfer of the first glass plate from the pallet onto the positioning table by the first transfer means, a detection of the real coordinate of the first glass plate on the positioning table by the detecting means, and a second transfer of the first glass plate from the positioning table to the target position on the conveyance table are conducted concurrently.

According to a second aspect of the present invention, there is provided a method for putting a glass plate to a target position. This method comprises the steps of:

(a) putting the glass plate at a preliminary position above an air table that discharges air upwardly, by moving a suction member that supports the glass plate through suction of the suction member;

(b) releasing suction of the suction member, while air is discharged upwardly from the air table, thereby floating the glass plate at the preliminary position above the air table; and (c) moving a pressing member in a horizontal direction, while the pressing member is in abutment with a top surface of the glass plate and while air is discharged upwardly from the air table, thereby moving the glass plate in the horizontal direction from the preliminary position above the air table to the target position above the air table by a frictional force generated between the pressing member and the glass plate.

According to the second aspect of the present invention, there is provided an apparatus for putting a glass plate to a target position. This apparatus comprises:

(a) an air table for discharging air upwardly such that the glass plate is floated above the air table by an upward force of the air;

(b) a suction member for supporting the glass plate by applying suction to the suction member, the suction member being movable to put the glass plate at a preliminary position above the air table when suction is applied to the suction member; and (c) a pressing member that is movable in a horizontal direction, while the pressing member is in abutment with a top surface of the glass plate, while suction is released from the suction member, and while air is discharged upwardly from the air table, thereby moving the glass plate in the horizontal direction from the preliminary position above the air table to the target position above the air table by a frictional force generated between the pressing member and the glass plate.

According to a third aspect of the present invention, there is provided a first robot for transferring standing plate members one by one. The first robot comprises:

a robotic arm;

a robotic hand formed on an end of the robotic arm;

a plurality of hollow guide members fixed to the robotic hand;

a plurality of suction members for supporting the standing plate members one by one, each suction member comprising (a) a hollow stem member that is slidably inserted in the guide member, (b) a suction cup attached to one end of the hollow stem member, and (c) a dog attached to the other end of the hollow stem member;

a plurality of springs, each being disposed between the guide member and the suction cup such that the hollow stem member being slidably movable in the guide member when the suction cups are pressed against the standing plate member by moving the robotic hand toward the standing plate member; and a plurality of pairs of first and second sensors, each pair of first and second sensors being provided for each dog of the suction member and being fixedly connected to the guide members, the first sensor being spaced away from the corresponding guide member by a first distance, the second sensor being spaced away from the corresponding guide member by a second distance that is longer than the first distance, each pair of the first and second sensors being positioned relative to the corresponding dog of the suction member such that, when the suction cup is pressed against the standing plate member to move the dog to a first position at which the dog is in the vicinity of or in contact with the first sensor, the dog is sensed by the first sensor, and when the suction cup is further pressed against the standing plate member to move the dog to a second position at which the dog is in the vicinity of or in contact with the second sensor, the dog is sensed by the second sensor.

According to the third aspect of the present invention, there is provided a first method for transferring standing plate members one by one using the first robot. The first method comprises the steps of:

(a) moving the robotic hand toward the standing plate member to press the suction cups against the standing plate member;

(b) applying suction to each suction cup;

(c) repeatedly correcting an angle of the robotic hand relative to the standing plate member, based on data from the plurality of pairs of the first and second sensors, until vacuum of each suction cup reaches a pressure that enables the suction cup to hold the standing plate member; and (d) transferring the standing plate member to a target place by moving the robotic arm.

According the third aspect of the present invention, there is provided a second method for transferring standing plate members one by one using a second robot. The second robot comprises:

a robotic arm;

a robotic hand formed on an end of the robotic arm;

a plurality of hollow guide members fixed to the robotic hand;

a plurality of suction members for supporting the standing plate members one by one, each suction member comprising (a) a hollow stem member that is slidably inserted in the guide member and (b) a suction cup attached to one end of the hollow stem member;

a plurality of springs, each being disposed between the guide member and the suction cup such that the hollow stem member being slidably movable in the guide member when the suction cups are pressed against the standing plate member by moving the robotic hand toward the standing plate member; and a plurality of displacement sensors provided for the corresponding suction cups, each displacement sensor being capable of measuring a change of a distance between the robotic hand and the suction cup.

The second method comprises the steps of:

(a) moving the robotic hand toward the standing plate member to press the suction cups against the standing plate member;

(b) applying suction to each suction cup;

(c) repeatedly correcting an angle of the robotic hand relative to the standing plate member, based on data from the displacement sensors, until vacuum of each suction cup reaches a pressure that enables the suction cup to hold the standing plate member;

(d) transferring the standing plate member to a target place by moving the robotic arm; and (e) correcting an angle of the robotic hand relative to the standing plate member to cancel a difference among changes measured by the displacement sensors, during return of the robotic arm from the target place.

According to a fourth aspect of the present invention, there is provided a method for transferring standing plate members one by one. This method comprises the steps of:

(a) moving a traveling head in a horizontal direction at a level higher than that of a top surface of the standing plate members, toward a first plate member that is positioned at a forefront of the standing plate members;

(b) stopping movement of the traveling head at a position above the first plate member;

(c) blowing air from an air blower of the traveling head to a boundary between the first plate member and a second plate member that is positioned next to the first plate member to provide a space therebetween;

(d) inserting a projection member of the traveling head into the space, thereby determining that the first plate member is separated from the second plate member by the space; and (e) transferring the first plate member, thereby leaving remainder of the standing plate members.

According to the fourth aspect of the present invention, there is provided an apparatus for separating standing plate members one by one. This apparatus comprises:

a traveling head that is movable in a horizontal direction at a level higher than that of a top surface of the standing plate members, toward a first plate member that is positioned at a forefront of the standing plate members and then toward a rearmost plate member of the standing plate members;

a sensor attached to the traveling head, for sensing position of a front surface of the first plate member, when the sensor comes to a position that is in the vicinity of or on the front surface of the first plate member;

an air blower attached to the traveling head, for blowing air to a boundary between the first plate member and a second plate member that is next to the first plate member to provide a space therebetween;

a projection member attached to the traveling head, the projection member being insertable into the space to determine that the first plate member is separated from the second plate member by the space; and a controller for controlling each of the traveling head, the air blower, and the projection member.

In the fourth aspect of the present invention, the apparatus can be used for conducting the steps (a) to (d) of the method.

DETAILED DESCRIPTION

Figure 1:
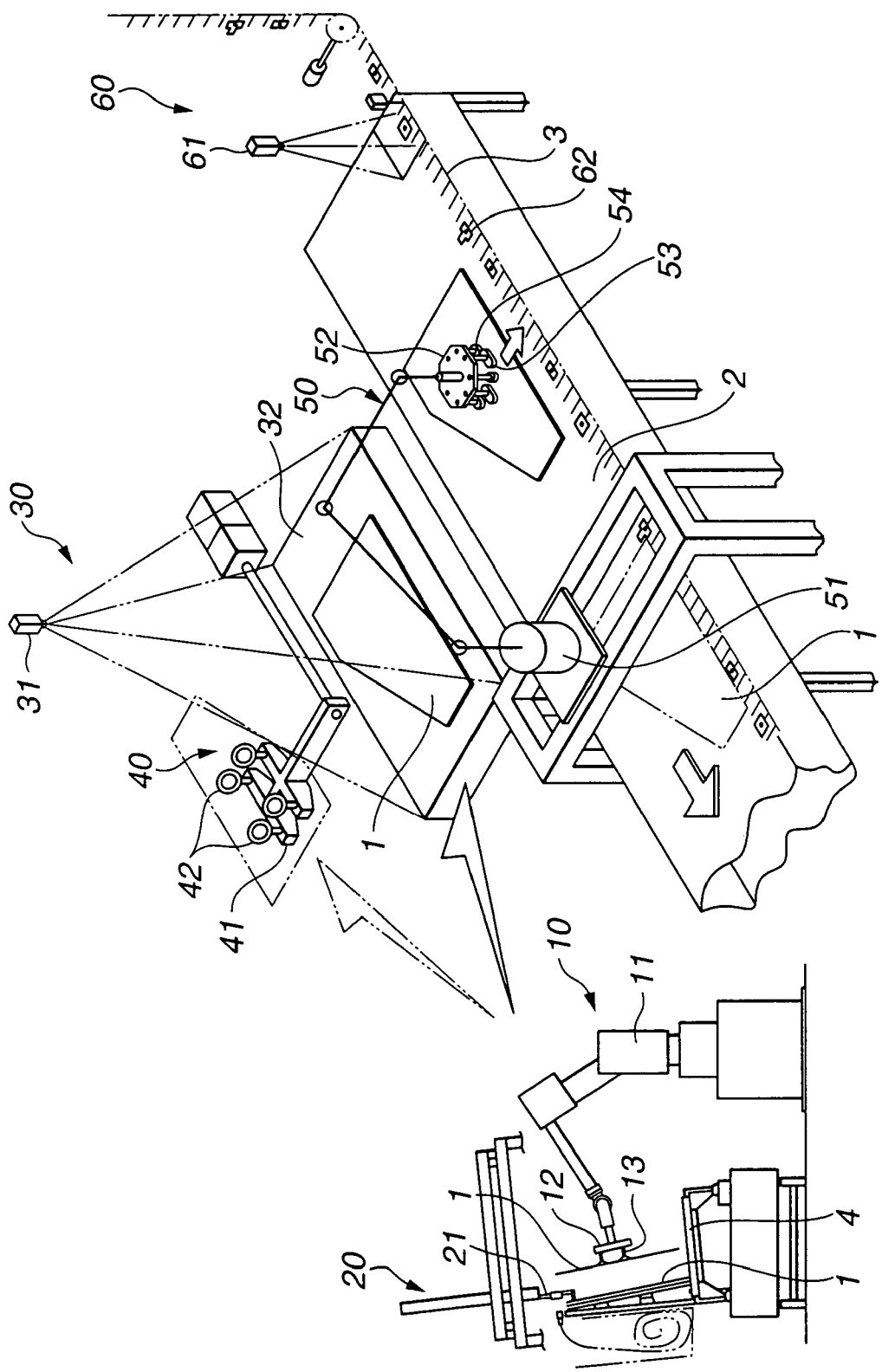
FIG. 1 is a schematic perspective view showing a system (according to the first aspect of the present invention) for automatically supplying glass plates into a bending furnace.

With reference to FIG. 1, a system (according to the first aspect of the present invention) for automatically supplying glass plates into a bending furnace is described in detail in the following.

The system has a first transfer means 10 (e.g., a transfer robot 11) for transferring a first glass plate 1 positioned at the forefront of glass plates 1 standing in a pallet 4 onto a positioning table 32 by supporting the first glass plate 1 with suction cups 13 of a transfer hand 12. The system further has a detecting means 30 for detecting the real coordinate of the first glass plate 1 on the positioning table 32 by imaging the first glass plate 1 on the positioning table 32 with a camera 31 that is placed above the positioning table 32. The system further has a second transfer means 50 for transferring the first glass plate 1 from the positioning table 32 to a target position on a conveyance table (air table) 2, while the position of the first glass plate 1 is corrected based on a difference between the real coordinate and a reference coordinate of the first glass plate 1 on the positioning table 32. Therefore, even if the real coordinate of the first glass plate 1 on the positioning table 32 deviates from its reference coordinate, it is possible to position the first glass plate 1 at a target position on the conveyance table 2 by such correction.

The system further has a separation means 20 in order to prevent the above-explained phenomena "blocking" by blowing air from an air nozzle 21 of the separation means 20 to provide a space between the first glass plate 1 at the forefront and the second glass plate next thereto. Details of the separation means 20 are explained hereinafter in accordance with the fourth aspect of the present invention. By using the separation means, it is possible to speedily and surely take only the first glass plates 1 one by one from the pallet 4.

In the detecting means 30, the position determination camera (e.g., CCD camera) 31 that is placed above the positioning table 32 takes an image of the real coordinate of the first glass plate 1 on the positioning table 32, and then deviation of the real coordinate (corresponding to the real position) of the first glass plate 1 from its reference coordinate (corresponding to its proper position) on the positioning table 32 is determined by an image processing device or the like (not shown in the drawings).

Depending on the size, shape, etc. of the first glass plate 1, it is optional to use a plurality of position determination cameras 31 to take images of the first glass plate 1 on the positioning table 32 and then to combine the resulting image data together to determine deviation of the real coordinate of the first glass plate 1 from its reference coordinate on the positioning table 32.

As mentioned above, the second transfer means 50 transfers the first glass plate 1 from the positioning table 32 onto the conveyance table 2 by supporting the first glass plate 1 with suction cups 53 formed on a robotic hand 52 of a transfer robot 51.

The suction cups 53 of the robotic hand 52 are brought into abutment with the first glass plate 1 placed on the positioning table 32 in a manner that the robotic hand 52 takes a corrected position and a corrected angle on the positioning table 32, in accordance with deviation of the first glass plate 1, which is actually placed on the positioning table, from its reference position and its reference angle. In other words, the relative position of the robotic hand 52 on the first glass plate placed on the positioning table 32 is always the same. The movement of the robotic hand 52 from the positioning table 32 to the conveyance table 2 is finely adjusted each time such that the first glass plate 1 always takes a proper position on the conveyance table 2. In other words, we can say that the deviation of the first glass plate on the positioning table 32 is corrected each time by the adjusted movement of the robotic hand 52 from the positioning table 32 to the conveyance table 2. With this correction, it is possible to properly bring the first glass plate 1 into contact with predetermined flights (positioning guides) 62 to lead the first glass plate 1 into a bending furnace.

The flights 62 are fixed at predetermined intervals to a conveyance chain 3 that is disposed in the vicinity of a side edge of the conveyance table 2. The first glass plate 1 is floated above the conveyance table 2 by air discharged upward from small openings formed on the top surface of the conveyance table 2. Furthermore, the first glass plate 1 is brought into abutment at its predetermined ends with the flights 62. Under this condition, the glass plates are guided one by one into the furnace by the flights.

One distinction tag, which is not brought into abutment with the first glass plate 1, is combined with two or three flights 62 for one glass sheet to be conveyed. The distinction tag and the flights 62 are each attached to ends of extension pins that are fixed to the conveyance chain 3 in a manner to extend shafts of outer links of the conveyance chain 3. Depending on the shape or size of glass plates to be introduced into the bending furnace, the distances of the corresponding flights 62 from the distinction tag are changed. In fact, the corresponding flights 62 are attached to the extension pins to have suitable distances from the distinction tag.

In the procedure to bring the first glass plate 1 into abutment with the corresponding flights 62, the distinction tag is detected by the detection camera 61. Then, the flights 62 are detected by the detection camera. Then, the first glass plate 1 is brought at a suitable timing with those flights 62 by the transfer robot 51.

In the case of producing window glass plates, for example, automotive right and left side windows that are dissymmetrical with each other, it may become necessary in some cases to put the glass plates one by one upside down on the positioning table 32.

In such cases, the first glass plate 1 is transferred from the pallet 4 onto a reversing hand (e.g., a robotic hand) 41 of a reversing member 40 (e.g., a robot), not onto the positioning table 32, such that the front and back surfaces of the first glass plate 1 in the pallet 4 respectively turn into the top and bottom surfaces of the first glass plate 1 on the reversing hand 41. Then, the first glass plate 1 is fixed onto suction cups 42 of the reversing hand 41 by applying suction to the suction cups 42. Then, the first glass plate 1 is placed upside down on the positioning table 32 by moving the reversing member 40.

According to the first aspect of the present invention, it is possible to concurrently conduct the steps of (a) the first transfer of the glass plate 1 from the pallet 4 onto the positioning table 32 optionally via the reversing member 40, (b) the detection of the real coordinate of the glass plate 1 on the positioning table 32 by the detection means 30, and (c) the second transfer of the glass plate 1 from the positioning table 32 to the target position on the conveyance table 2. With this, it is possible to greatly shorten the period of time from taking the glass plates 1 out of the pallet 4 to setting the glass plates to the flights 62 on the conveyance table 2. The step (c) is described in detail hereinafter in accordance with the second aspect of the present invention.

As stated above, the first glass plate 1 is transferred from the positioning table 32 onto the conveyance table 2, while the first glass plate 1 is supported by the suction cups 53 of the second transfer means 50. Then, it is necessary to bring the first glass plate 1 into abutment with the predetermined flights. The flights are attached to ends of the extension pins fixed to the conveyance chain 3 in a manner to extend the shafts of the outer links of the conveyance chain 3. Thus, the transfer distance of each glass plate until each glass plate takes a position in abutment with the flights varies slightly due to extension of the conveyance chain or due to that the flights attached to the extension pins do not always take constant positions.

In order to absorb the variation of the above transfer distance, the glass plate is put at a preliminary position above the conveyance table 2 that discharges air upwardly. Then, suction of the suction cups 53 is released, while air is discharged upwardly from the conveyance table 2. Then, the robotic hand 52 is moved toward the flights 62, while a pressing member 54 of the robotic hand 52 is in abutment with the glass plate 1. Under this condition, the glass plate is horizontally movable or slidable relative to the robotic hand. Therefore, the variation of the transfer distance can be absorbed by the horizontal movement of the glass plate. In other words, the position of the glass plate relative to the flights is corrected automatically, surely, precisely and easily with high speed due to play of the flights, when each glass plate abuts against the flights. The transfer of the glass plate to bring it into abutment with the flights is described in detail hereinafter in accordance with the second aspect of the present invention.

With reference to FIGS. 2 to 6, 7A to 7D and 8A to 8D, a method and an apparatus for putting a glass plate to a target position are described in detail in accordance with the second aspect of the present invention. It is optional to use this method and this apparatus in the second transfer (according to the first aspect of the present invention) of the first glass plate from the positioning table to the target position on the conveyance table (see FIG. 1).

Figure 2:
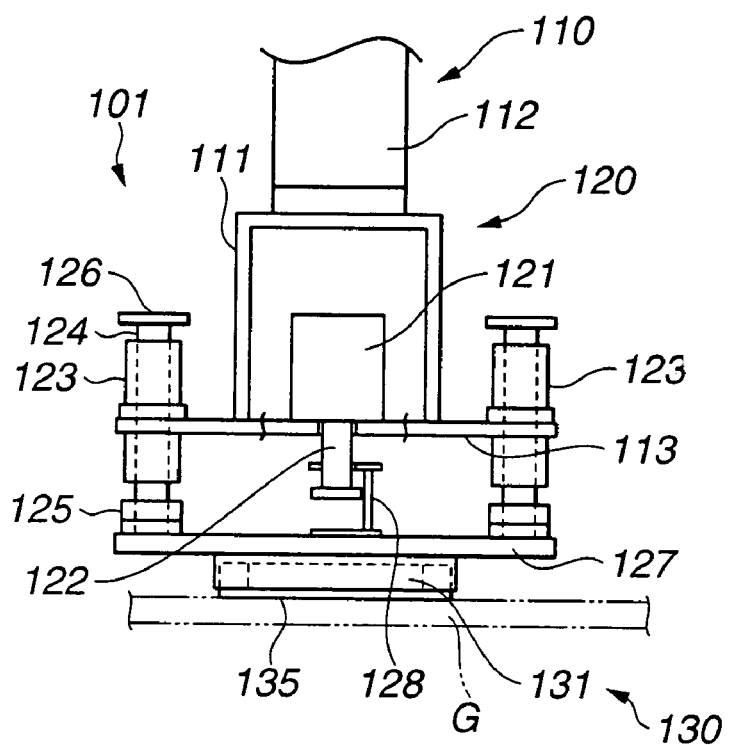
FIG. 2 is a side view showing a first robotic hand according to one embodiment of the second aspect of the present invention.

As is seen from FIG. 2, an apparatus 101 (according to one embodiment of the second aspect of the present invention) for putting a glass plate G to a target position can perform the sequential steps of (a) horizontally putting the glass plate G at a predetermined position above an air table (conveyance table) 102 that discharges air upwardly, while the glass plate G is supported by a suction cup (suction member) 131 formed on a robotic hand 111 of a robot 110 or the like, (b) releasing suction of the suction cup 131, while air is discharged upwardly from the air table 102, thereby floating the glass plate G at the preliminary position above the air table 102, and (c) moving a pressing member 135 (made of sponge rubber or the like) in a horizontal direction, while the pressing member 135 is in abutment with the top surface of the glass plate G and while air is discharged upwardly from the air table 102, thereby moving the glass plate G in the horizontal direction from the preliminary position above the air table to the target position above the air table 102 by a frictional force generated between the pressing member 135 and the glass plate G. It is possible to conduct this movement in a manner to bring the glass plate G into abutment with a plurality of positioning guides (flights) 103 arranged along one longitudinal side of the air table 102. With this, the glass plate G can be guided into a bending furnace by the positioning guides 103 attached to a conveyance chain that is continuously driven at a constant speed.

The air table 102 can have on its top surface many small openings for discharging air upwardly. With this, the glass plate G can be floated above the air table 102.

As is seen from FIG. 2, the robotic hand 111 has (a) a supporting plate 113 fixed at an end of a robotic arm 112 and (b) a drive means 120 that is attached to a middle portion of the supporting plate 113 and moves a suction means 130 up and down by a drive cylinder 121.

In the drive means 120, the drive cylinder 121 is attached to the center of the supporting plate 113, and a movable plate 127 is connected to an end of a cylinder rod 122 through a bracket 128. This cylinder rod 122 is extendible downward by energizing the drive cylinder 121.

The suction cup 131 is formed as the suction means 130 at a central portion of the movable plate 127

The supporting plate 113 is formed at its both ends with a pair of cylindrical guides 123, and guiding shafts 124 are slidably received in the cylindrical guides 123. Each guiding shaft is formed at its upper end with a stopper 126 and is connected at its lower end to an end of the movable plate 127 through a fixing member 125. Thus, it is possible to smoothly move the movable plate 127 up and down through cylindrical guides 123, when the cylindrical rod 122 is extended downwardly or contracted upwardly by energizing the drive cylinder 121.

Under normal condition, the drive cylinder 121 is set to make the cylinder rod 122 extended downwardly. Under abnormal condition with the robot or the like, the cylinder rod 122 is withdrawn upwardly to separate the robotic hand 111 from the glass plate G. With this, it is possible to prevent the glass plate G from hitting against the positioning guides that move together with the chain.

Figure 3:
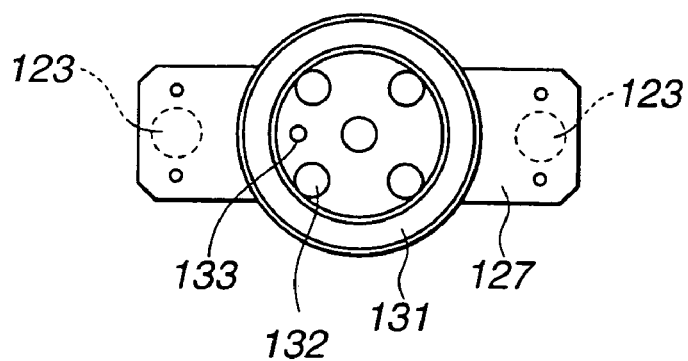
FIG. 3 is a bottom view of the first robotic hand.

As is seen from FIG. 3, the suction cup 131 has a bottom peripheral portion made of rubber, and the pressing member (made of a sponge rubber) 135 is bonded to the bottom peripheral portion to have a large frictional force between the pressing member 135 and the glass plate G.

The suction cup 131 has a plurality of stoppers 132 in its inside space in order to prevent the suction cup 131 from having an insufficient suction when a suction conduit 133 is closed by an excessive compression of the pressing member 135.

Figure 4:
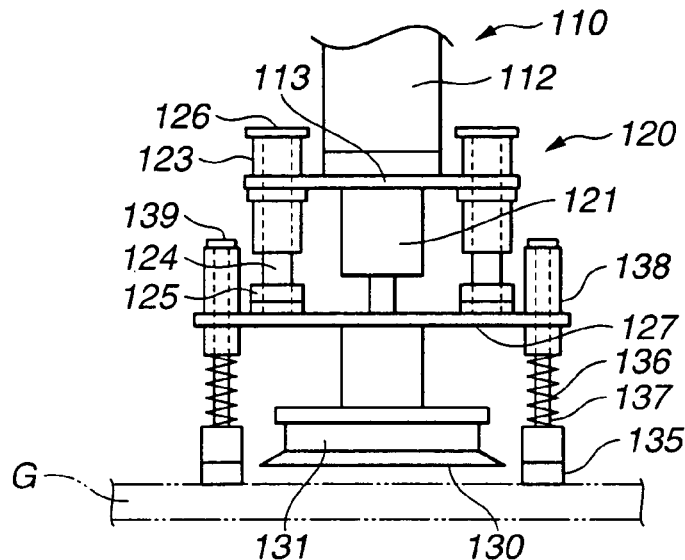
FIG. 4 is a side view showing a second robotic hand according to another embodiment of the second aspect of the present invention.
Figure 5:
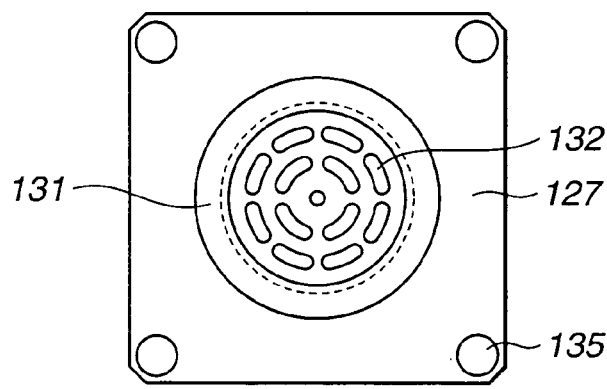
FIG. 5 is a bottom view of the second robotic hand.
Figure 6:
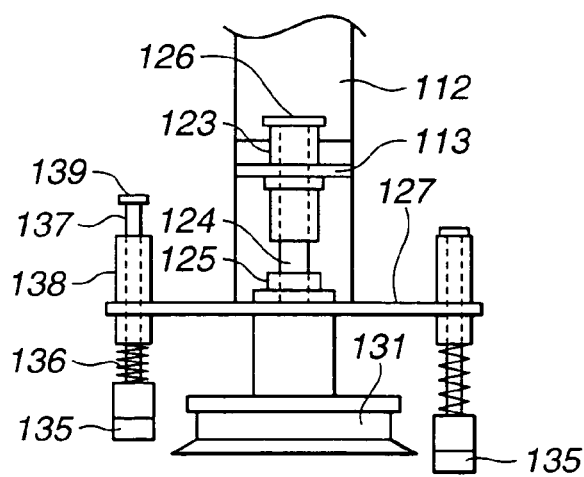
FIG. 6 is a frontal view of the second robotic hand.

With reference to FIGS. 4-6, a second robotic hand according to another embodiment of the second aspect of the present invention is explained in detail in the following. The second robotic hand is similar to the above-explained robotic hand, except in that pressing members 135 are disposed to be outwardly away from the suction cup 131. Therefore, parts of the second robotic hand that are similar to those of the first robotic hand are denoted by the same numerals as those of the first robotic hand, and their detailed explanations are omitted.

As is seen from FIGS. 4-6, four cylindrical guides 138 are provided at four corner portions of a movable plate 127. Four pressing rods 137 are slidably received in the cylindrical guides 138 and are formed at their upper ends with stoppers 139 and at their lower ends with pressing members 135.

A spring member 136 is provided in a manner to surround each pressing rod 137 between the pressing member 135 and the cylindrical guide 138. With this, each pressing member 135 is biased downwardly by repulsive force of the spring member 136. Each pressing rod 137 is prevented from falling down by the stopper 139.

While the glass plate G is moved from the preliminary position above the air table to the target position above the air table, suction is released from the suction cup 131. Under normal condition, the cylinder rod 122 is made to be in an extended condition. When abnormality occurs with the robot or the like, it is necessary to withdraw the cylinder rod 122 upwardly in order to separate the robotic hand from the glass plate G.

During transfer to the preliminary position above the air table, suction is applied to the suction cup 131 under a condition that the spring members 135 are compressed by a certain degree.

To put the glass plate at the preliminary position, it is possible to take a first or second method. In the first method, suction is released at a position that is slightly higher than the preliminary position. With this, the glass plate is lowered to the preliminary position by its own weight, and the glass plate is separated from the suction cup 131, but is still in abutment with the pressing members 135. In the second method, suction is released at the preliminary position. Then, the robotic hand is slightly raised in a manner that the glass plate is separated from the suction cup, but is still in abutment with the pressing members 135.

As stated above, the pressing member 135 is made of a sponge rubber or the like to give a high frictional force between the pressing member 135 and the glass plate surface. Thus, the glass plate is moved horizontally by such frictional force to bring the glass plate into abutment with the positioning guides 103. Even if the pressing member is moved further, the pressing member slides over the glass plate, and the glass plate is kept in abutment with the positioning guides 103, since the frictional force is not so strong.

With reference to FIGS. 7A to 7D, operation of the first robotic hand according to the second aspect of the present invention is explained in detail, as follows.

Figure 7A:
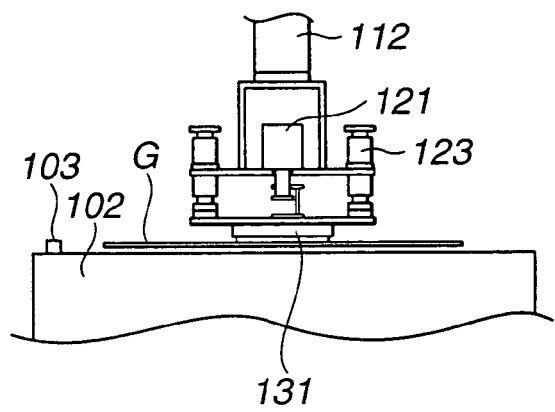
FIGS. 7A to 7D are sequential side views showing operation of the first robotic hand.

As is seen from FIG. 7A, the glass plate is put at a preliminary position (a middle position) above the air table 102 by moving the robotic hand 112, while the glass plate G is supported by the suction cup 131 through suction of the suction cup 131. Then, suction of the suction cup 131 is released, while air is discharged upwardly from small openings of the air table 102, thereby floating the glass plate G at the preliminary position above the air table 102. It suffices to have an air pressure to slightly float the glass plate G (e.g., 2 or 3 mm) above the air table 102. Under the floating condition, the glass plate G is pressed upwardly against the suction cup 131.

Figure 7B:
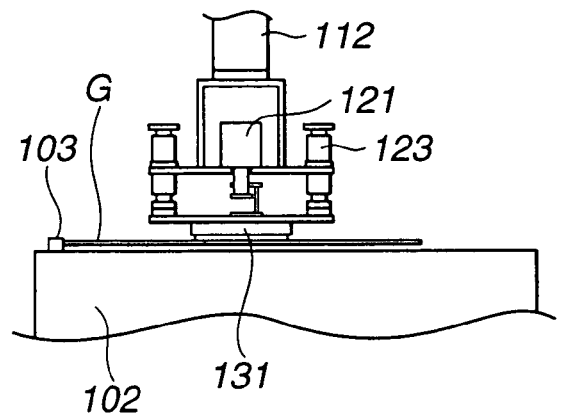
Figure 7C:
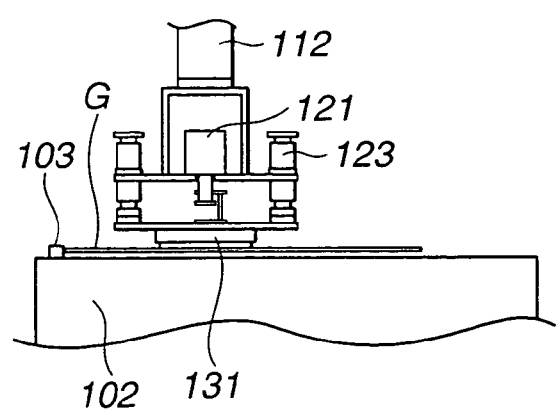
Figure 7D:
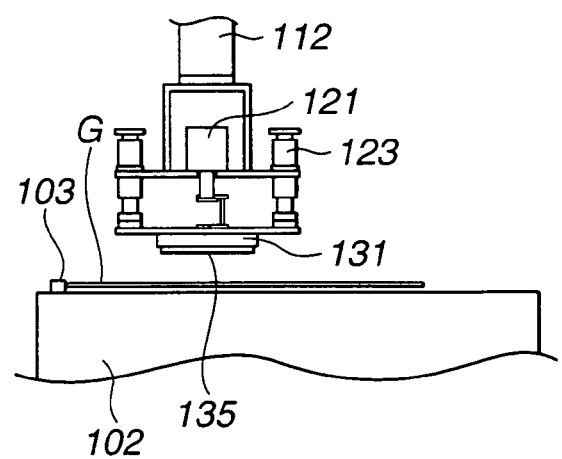

Then, as is seen from FIG. 7B, the robotic hand 112 is moved horizontally toward the positioning guides 103 to bring the glass plate G into abutment with the positioning guides 103 by a frictional force between the glass plate G and the pressing member 135. When the robotic hand 112 is moved further toward the positioning guides 103, the robotic hand 112 slides over the glass plate G since the frictional force is not so strong, and the glass plate G is kept in abutment with the positioning guides 103 (see FIG. 7C). After the robotic arm 112 is moved horizontally by a predetermined distance toward the positioning guides 103, the robotic arm 112 is raised (see FIG. 7D). With this, the positioning of the glass plate G is completed.

With reference to FIGS. 8A to 8D, operation of the second robotic arm according to the second aspect of the present invention is explained in detail, as follows.

Figure 8A:
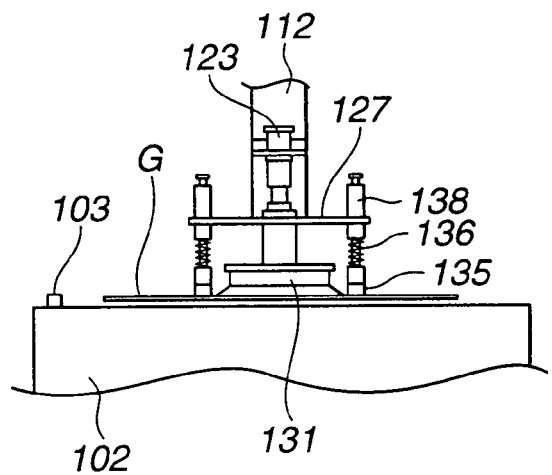
FIGS. 8A to 8D are sequential side views showing operation of the second robotic hand.

As is seen from FIG. 8A, the glass plate is put at a preliminary position (a middle position) above the air table 102 by moving the robotic hand 112, while the glass plate G is supported by the suction cup 131 through suction of the suction cup 131 and while the pressing members 135 are biased against the glass plate G. Then, suction of the suction cup 131 is released, while air is discharged upwardly from small openings of the air table 102, thereby floating the glass plate G at the preliminary position above the air table 102. It suffices to have an air pressure to slightly float the glass plate G (e.g., 2 or 3 mm) above the air table 102. Under the floating condition, the glass plate G is pressed upwardly against the suction cup 131 and the pressing members 135.

Figure 8B:
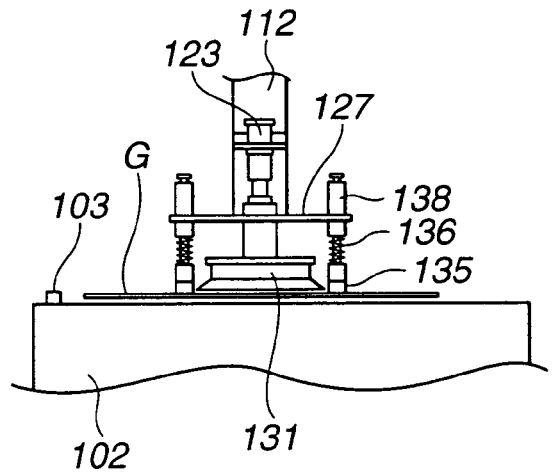
Figure 8C:
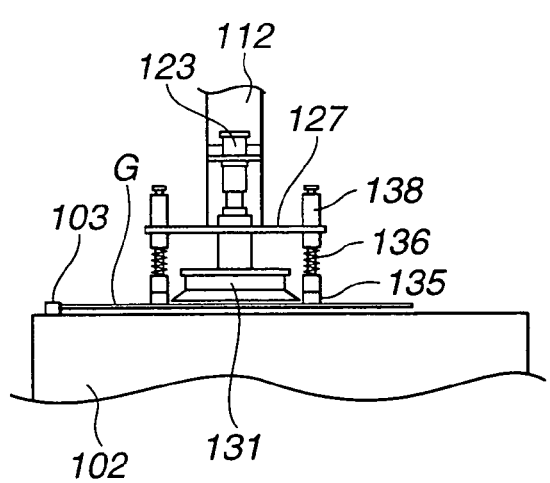
Figure 8D:
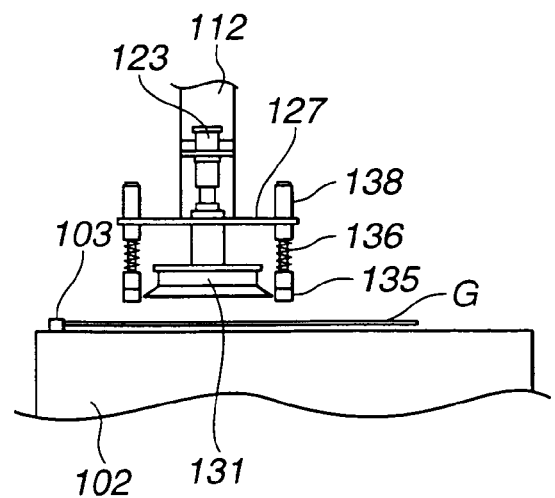

Then, as is seen from FIG. 8B, the robotic hand 112 may slightly be raised. With this, the suction cup 131 is separated from the glass plate G, but the pressing members 135 are kept in contact with the glass plate G. Under this condition, the robotic hand 112 is moved horizontally toward the positioning guides 103 to bring the glass plate G into abutment with the positioning guides 103 by a frictional force between the glass plate G and the pressing member 135. When the robotic hand 112 is moved further toward the positioning guides 103, the robotic hand 112 slides over the glass plate G since the frictional force is not so strong, and the glass plate G is kept in abutment with the positioning guides 103 (see FIG. 8C). After the robotic arm 112 is moved horizontally by a predetermined distance toward the positioning guides 103, the robotic arm 112 is raised (see FIG. 8D). With this, the positioning of the glass plate G is completed.

After the glass plate G is positioned at the target position (where the glass plate G is in abutment with the positioning guides 103), the glass plate G is transferred to the place of the next step (e.g., a bending furnace).

The glass plate G is not particularly limited in shape. It may be rectangular, triangular, or trapezoidal.

The positioning guides 103 may be attached to a conveyance chain that moves at a constant speed or may be attached at rest to the air table.

According to the second aspect of the present invention, it is possible to bring glass plates one by one assuredly and easily with high precision and with high speed into abutment with positioning guides (flights) that may have play, even if the glass plates have various shapes.

Figure 9:
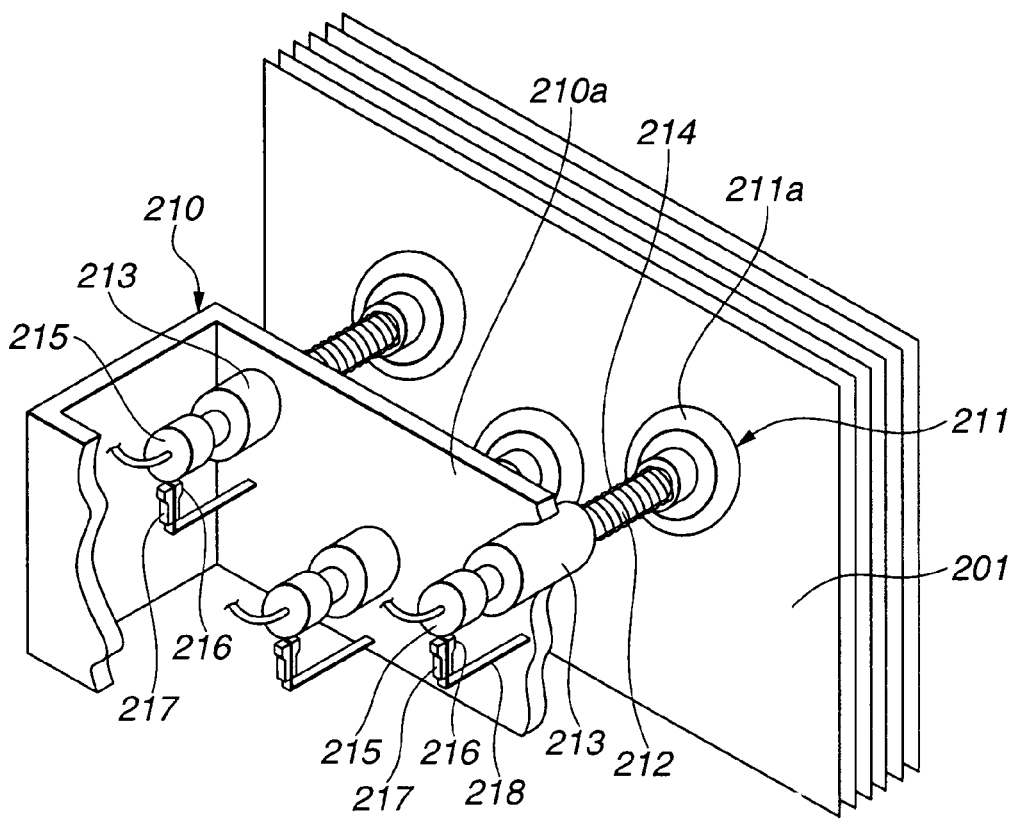
FIG. 9 is a perspective view showing a robotic hand (partially broken away) according to the third aspect of the present invention.

With reference to FIGS. 9-13, the first and second robots and the first and second methods for transferring standing plate members (e.g., glass plates) according to the third aspect of the present invention are described in detail, as follows. The first or second robot and the first or second method may respectively be used as the first transfer means and the first transfer of the above-explained system (see FIG. 1) according to the first aspect of the present invention As is seen from FIG. 13, the first robot (articulated robot) 203, which is pivotable and movable toward any direction, has a robotic arm 204 and a robotic hand (suction hand) 210 formed on an end of the robotic arm 204. The robotic hand 210 is formed at its front end with a plurality of suction members 211 (e.g., three suction members, as shown in FIGS. 9 and 10A) for automatically and continuously transferring a plate member 201 that is positioned at the forefront of the plate members 201 standing in a pallet 202, by moving the robotic arm 204 while suction is applied to the suction members 211 to support the plate member 201.

As is seen from FIG. 9, the robotic hand 210 is boxlike in shape and has a front plate member 210a. This front plate member 210a has three circular openings, through which three hollow guide members 213 are fixed to the front plate member 210a in a manner that the axis of each hollow guide member 213 is perpendicular to the front plate member 210a. Each hollow guide member 213 has a front portion, which projects from the front plate member 210a, and a back portion, which is received in the inside of the robotic hand 210 (see FIG. 10B).

Each suction member 211 has (a) a suction cup 211a (made of rubber), (b) a hollow stem member 212 that extends from the suction cup 211a and is slidably inserted in the guide member 213, and (c) a dog 215 attached to the back end of the stem member 212. The stem 212 has a central void space for applying suction to the suction cup 211a. A spring 214 is disposed between the suction cup 211a and the front end of the guide member 213 such that the stem member 212 is slidably movable in the guide member 213 when the suction cup 211a is pressed against the plate member 201 by moving the robotic hand 210 toward the plate member 201. The dog 215 is a member to be sensed by the after-mentioned first and second sensors. Furthermore, the dog 215 serves as a stopper for preventing the stem member 212 from coming out of the guide member 213.

Figure 10A:
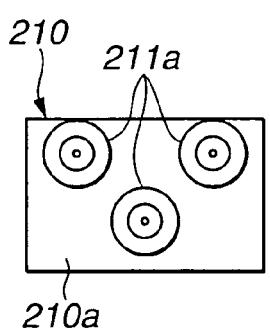
FIGS. 10A and 10B are respectively front and side views of the robotic hand according to the third aspect of the present invention.
Figure 10B:
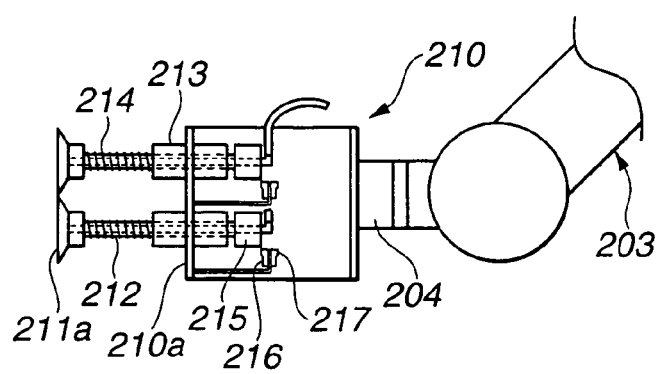

As is seen from FIG. 10B, a pair of first and second sensors 216 and 217 is provided for each dog 215 and is fixed to a support member extending from the front plate 210a. A pair of first and second sensors 216 and 217 is disposed at a suitable position that is away from the front plate member 210a and is in the proximity of the track of the reciprocal movement of the dog 215 such that the dog 215 is sensed by the first and/or second sensor when the dog 215 moves to a position at which the dog 215 is in contact with or in the proximity of the first and/or second sensor. Therefore, it is possible to determine the position of the dog relative to the first and second sensors 216 and 217. In other words, it is possible to determine the degree of projection of the suction cup 211a from the front plate member 210a.

The first and second sensors 116 and 117 are not particularly limited, as long as they sense the dog 115. They may be proximity sensors, photoelectric sensors, contact-type limit switches, etc.

As is seen from FIG. 10A, it is preferable to provide at least three of the suction cups 211a in vertical and horizontal directions. With this, it is possible to correct the angle of the front plate member 210a relative to the plate member 201 in vertical and horizontal directions.

Operation of the robotic hand 210 is described in the following. When the suction cups 211a are pressed against the plate member 201 by moving the robotic hand 210 in a direction perpendicular to the plate member 201 under a condition that the front major surface of the plate member 201 is parallel with the front plate member 210a (see FIG. 13), each dog 215 is moved backward and then takes a reference position at which the back end of the dog 215 is in front of the first sensor 216 and is slightly away from the second sensor. Therefore, all the first sensor 216 are switched on at the reference position to send a signal, but all the second sensor 217 are still switched off at the reference position not to send a signal. It is needles to say that all the suction cups 211a are arranged parallel to the front major surface of the plate member 201 at the reference position. If suction is applied to the suction cups 211a at the reference position, it is possible to have a predetermine suction at each suction cup 211a to firmly support the plate member 201.

In order to firmly support the plate member 201 by the robotic hand 210, it is possible to move the robotic hand 210 toward the plate member 201 in a manner to obtain a suitable condition in which front plate member 210a is parallel with the plate member 201. In other words, if the robotic hand 210 (the front plate member 210a) is inclined relative to the plate member (see FIG. 11), it is possible to adjust the angle of the robotic hand 210 relative to the plate member 201 to obtain the suitable condition.

Whether the robotic hand 210 is inclined or not relative to the plate member 201 can be determined by the data of the first and second sensors 216 and 217. For example, when all the first sensors 216 are switched on and all the second sensors 217 are switched off; the robotic hand 210 can be determined as being not inclined relative to the plate member 201.

In order to transfer the plate member 1, the robotic hand 210 is moved toward the plate member 201 in a manner to press the suction cups 211a against the plate member 201 until any one of the first sensors is switched on. Then, it is optimum to continue to move the robotic hand 210 to take the above-mentioned reference position at which all the first sensors 216 are switched on and at which all the second sensors 217 are switched off. According to the present invention, however, it is not necessary to take the reference position. When the robotic hand 210 is still inclined relative to the plate member 201, some of the first sensors 216 are switched on, but the remainders of the first sensors 216 are still switched off.

According to the present invention, even when the robotic hand 210 is still inclined relative to the plate member 201, suction is applied to the suction cups 211a, and the pressure of each suction cup 211a is checked whether or not it has reached a requisite pressure that enables a firm supporting of the plate member 201. If not, the angle of the robotic hand 210 is corrected stepwise by a predetermined angle by a controller (not shown in the drawings), based on on-off data of the first and second sensors 216 and 217, toward the reference position, and the pressure of each suction cup 211a is checked again. These procedures are continued until the pressure of each suction cup 211a reaches the requisite pressure. In other words, when any one of the suction cups 211a has a pressure less than the requisite pressure, the angle correction of the robotic hand 210 is continued. Thus, it is not necessary to continue the angle correction until the robotic hand 210 becomes in perfectly parallel with the plate member 201.

Once the pressure of each suction cup 211a reaches the requisite pressure, signals of data (the positional data, the angular data and the like) of the robotic hand 210 are sent to the controller, and then the robotic hand 210 transfers the plate member 201 from the pallet 2 to a target position, irrespective of whether or not the robotic hand 210 is inclined relative to the plate member 201. Even if the robotic hand 210 is inclined relative to the plate member 201, the inclination is very small when the pressure of each suction cup 211*a* has already reached the requisite pressure. Therefore, it is possible to prevent the instant plate member from damaging the next plate member during the transfer of the instant plate member during which the instant plate member is moved by bounces of the spring 214 and of the suction cup 211*a*, for example, from a condition shown in FIG. 11 to a condition shown in FIG. 12 to cancel the inclination.

Figure 13:
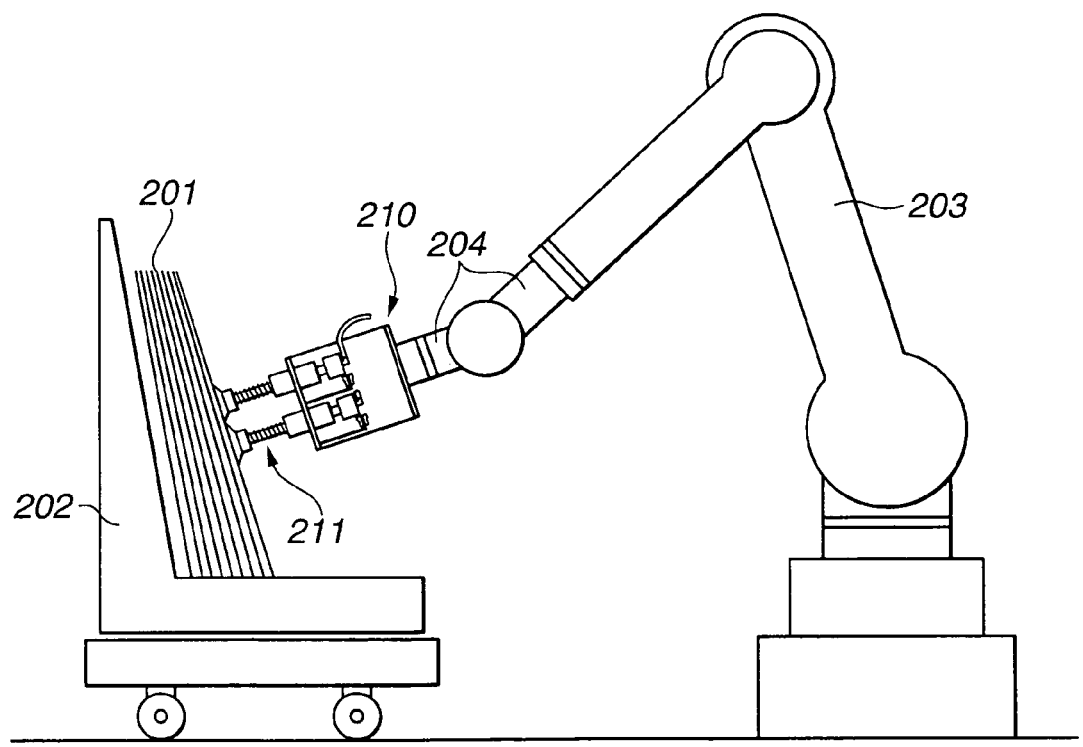
FIG. 13 is a side view showing a condition in which the robotic hand is not inclined relative to a glass plate at the forefront of glass plates in a pallet.

In order to transfer the next plate member 201, the angle of the robotic hand 210 is corrected by the controller in a manner to decrease the inclination of the robotic hand 210 relative to the previous plate member 201, based on the previous data of the first and second sensors 216 and 217, in view of the fact that the angular position of the next plate member 201 in the pallet 2 is substantially the same as that of the previous plate member 201 (see FIG. 13).

Figure 11:
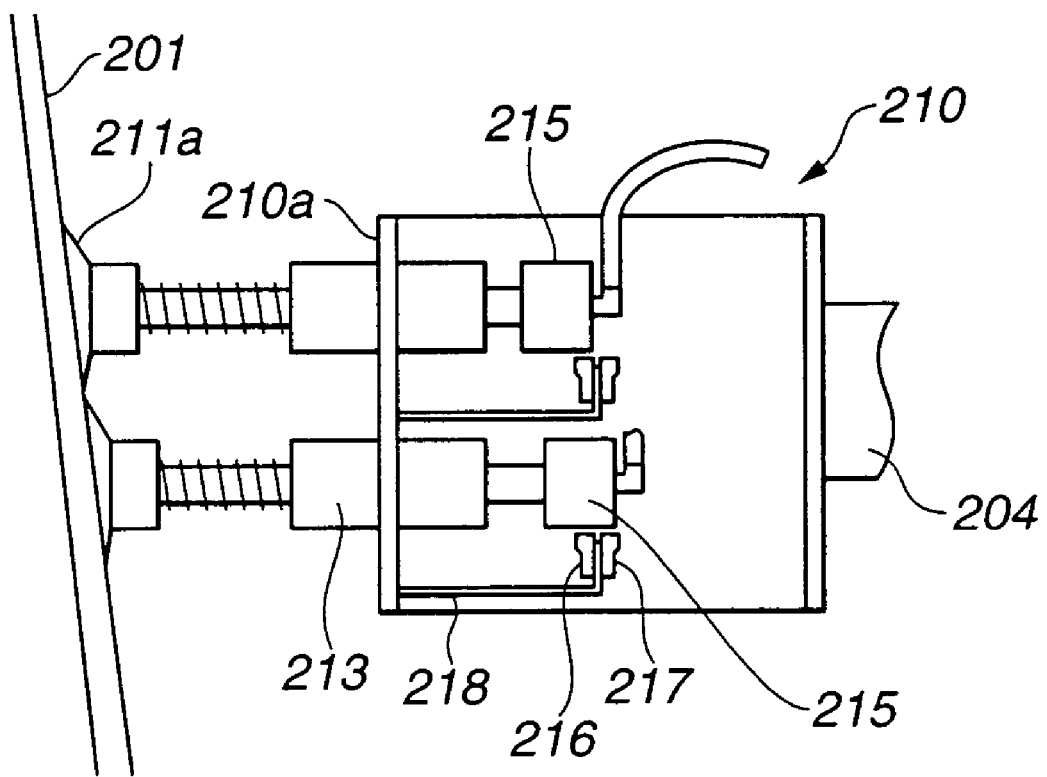
FIG. 11 is a view similar to FIG. 10B, but showing a condition in which the robotic hand is inclined relative to a glass plate.
Figure 12:
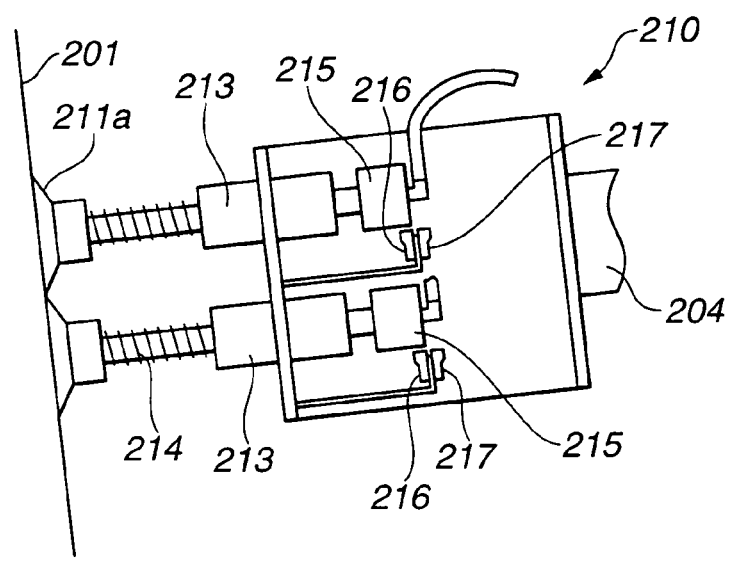
FIG. 12 is a side view showing a condition in which a glass plate is transferred by the robotic hand.

As is seen from FIG. 11, when both the first sensor 216 and the corresponding second sensor 217 of one pair (the lower pair in FIG. 11) are switched on, it is determined that the corresponding suction cup 211*a* (the lower suction cup in FIG. 11) has been pressed against the plate member 201 too much. Then, the position and the angle of the robotic hand 210 are corrected in a manner to increase the distance between the robotic hand 210 and the corresponding suction cup 210*a*. For the next plate member 201, the correction is conducted in view of the thickness of the plate member 201.

In contrast, when both the first sensor 216 and the corresponding second sensor 217 of one pair are switched off, it is determined that the corresponding suction cup 211*a* has not been pressed at all (as shown in FIG. 10B) or has insufficiently been pressed against the plate member 201. Then, the position and the angle of the robotic hand 210 are corrected in a manner to decrease the distance between the robotic hand 210 and the corresponding suction cup 210*a*. For the next plate member, the correction is conducted in view of the thickness of the plate member 201.

As is seen from FIG. 11, when the first sensor 216 is switched on and the corresponding second sensor 217 of one pair (the upper pair in FIG. 11) is switched off, it is determined that the corresponding suction cup 211*a* has adequately been pressed against the plate member 201. Therefore, the distance between the robotic hand 210 and the corresponding suction cup 210*a* is maintained for the instant plate member 201 against which the suction cups 211*a* are pressed. In contrast, for the next plate member, the position of the robotic hand 210 is moved forward by the thickness of the plate member 201.

The above-mentioned angle correction of the robotic hand 210 for the next the plate member 201 is conducted continuously and stepwise by a predetermined angle as the transfer of the plate members 201 continues. Therefore, the angle of the robotic hand 210 is adjusted continuously and stepwise toward a condition in which the angle of the robotic hand 210 is in parallel with the plate member 201. The predetermined angle is, for example, 1 degree and may vary depending on the thickness and the height of the plate member 201 and the average space between the lower end of the instant plate member and that of the next one.

It is preferable to conduct the angle correction of the robotic hand 210 during return of the robotic hand 210 from the target position to the original position close to the pallet 202. With this, it becomes possible to conduct the transfer of the plate members 201 with less period of time.

The second robot according to the third aspect of the present invention is identical with the above-mentioned first robot except in that the former has a plurality of displacement sensors (not shown in the drawings) in place of a plurality of the first and second sensors of the latter. Each displacement sensor is provided for each suction cup 211*a* and is capable of measuring the change of the distance between the corresponding suction cup 211*a* and the robotic hand 210. By using the second robot, it is possible to correct the angle of the robotic hand 210 during return of the robotic hand after the transfer of the instant plate member 201 to the target position to make the robotic hand 210 in perfectly parallel with the next plate member It is preferable to correct the angle of the robotic hand 210, in view of the space between the lower end of the instant plate member 201 and that of the next plate member, during every return of the robotic hand from the target position to the original position The suction cup 211*a* has a thin lip portion and is made of a material such as nitrile rubber, silicone rubber, viton rubber, and urethane rubber.

As is seen from FIG. 13, in the case of transferring the forefront plate member 201 of the plate members standing in the pallet 202, it is preferable to input into the controller of the first or second robot 203 by teaching the data of the position and the angle of the robotic hand 210 relative to the forefront plate member 201, based on the angle and the position of the forefront plate member 201, depending on the shape, the size, the thickness, and the number of the plate members standing in the pallet 202.

The plate members 201 may be tempered glass plates, half-tempered ones, non-tempered ones, synthetic resin boards, steel plates, and panel members. The plate members 201 may be flat or moderately curved.

With reference to FIGS. 14 and 15A to 15H, a method for transferring standing plate members one by one and an apparatus (hereinafter "the separation apparatus") for separating standing plate members one by one are described in detail in accordance with the present invention, as follows. As stated above, this apparatus can be used in this method. Furthermore, the apparatus and the method may respectively be the separation means and the first transfer of the system (see FIG. 1) according to the first aspect of the present invention.

Figure 14:
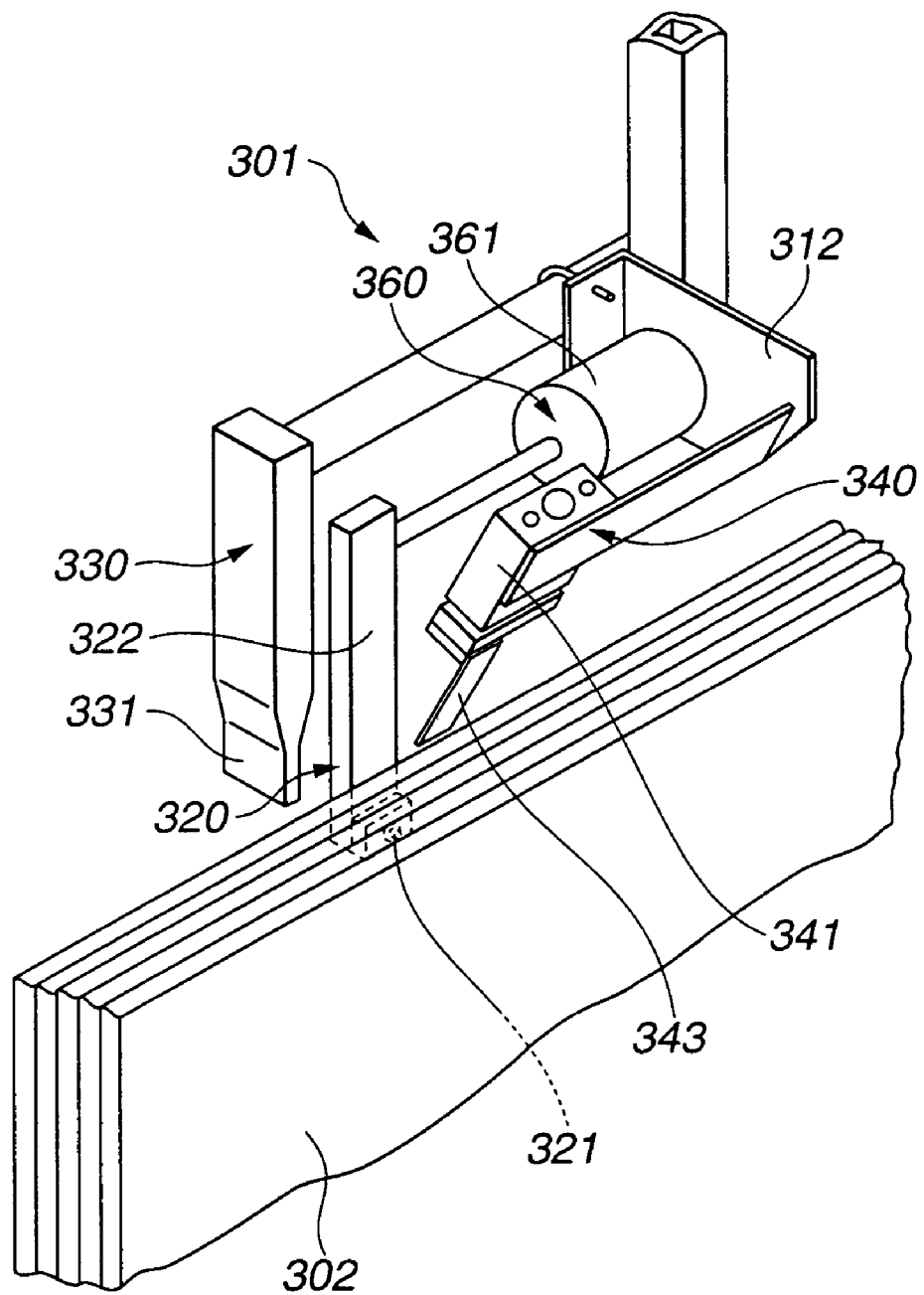
FIG. 14 is a perspective view showing an apparatus for separating standing plate members one by one.
Figure 15A:
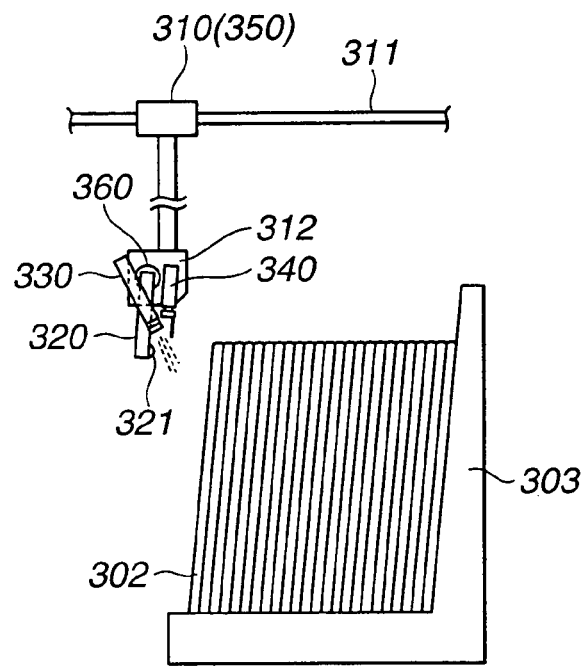
FIGS. 15A to 15H are sequential side views showing operation of the apparatus of FIG. 14.

As is seen from FIGS. 14 and 15A, the separation apparatus 301 may comprise:

(a) a traveling head 312 that is movable in a horizontal direction at a level higher than that of the top surface of the standing plate members, toward the forefront plate member 302 and then toward the rearmost plate member;

(b) a plate member detecting means 320 for detecting the position of the top edge on the front surface of the forefront plate member 302 of the plate members 302 (e.g., glass plates) standing in a pallet 303, by a sensor 321, when the sensor 321 comes to a position that is in the vicinity of or on the front surface of the forefront plate member;

(b) an air blower 330 equipped with an air nozzle 331, for blowing air to a boundary between the forefront plate member and the second plate member that is next to the forefront plate member to provide a space therebetween;

(c) a projection means 340 for inserting a projection piece 343 into the space to determine that the forefront plate member is separated from the second plate member by the space;

(d) a moving means 310 for moving the traveling head 312; and (e) a controller (not shown in the drawings) for controlling each of the moving means 310, the plate member detecting means 320, the air blower 330, and the projection means 340.

The plate member detecting means 320, the air blower 330 and the projection means 340 are attached to the traveling head 312.

The moving means 310 moves on a rail 311 in a horizontal direction at a level higher than that of the top surface of the plate members 302 standing in the pallet 303, toward the forefront plate member and then toward the rearmost plate member. The apparatus may further comprise a means 360 for moving the sensor 321 to a position above the top surface of the standing plate members such that the sensor can escape from the movement of a transfer means (e.g., a robotic hand) for transferring the forefront plate member.

The plate member detecting means 320 comprises the sensor 321 formed at a lower end of an arm 322 that is hung on the traveling head 312. The sensor 321 sends a signal, when it takes a position that is in contact with or in the proximity of an upper end of the front surface of the forefront plate member 302, thereby detecting its position.

The sensor may be a contact-type limit switch, photoelectric proximity sensor, or the like.

The air blower 330 comprises (a) the air nozzle 331 attached to the traveling head 312 and (b) a solenoid valve (not shown in the drawings). Air is ejected from the air nozzle 331 by energizing the air blower 330, and it is possible to stop or restart the air ejection by closing or opening the solenoid valve.

The air blower 330 ejects air into the boundary between the forefront plate member and the next plate member to provide a space therebetween. Under this condition, the position of the forefront plate member is detected by the sensor 321, thereby stopping the movement of the traveling head 312.

The projection means 340 has a cylinder 341 that is movable up-and-down and is attached to the traveling head 312. This cylinder 341 has a plate-like projection piece 343 fixed to the lower end of a cylinder rod 342 of the cylinder 341. Therefore, the projection piece 343 is also movable up-and-down.

Under a condition that the traveling head 312 has been stopped after the detection of the position of the forefront plate member by the sensor 321, a space is already provided between the forefront plate member and the next plate member by operation of the air blower 330. In this situation, the projection piece 343 is inserted into the space.

When the projection piece 343 has successfully been inserted into the space, it is determined that the forefront plate member is successfully separated from the next plate member. In contrast, when it was not possible to insert the projection piece 343 between the forefront plate member and the next plate member, it is determined that the forefront plate member is not successfully separated from the next plate member. In this case, the traveling head 310 is withdrawn by a short distance away from the forefront plate member. Then, the traveling head 310 is moved again toward the forefront plate member. While air is ejected again into the boundary between the forefront plate member and the next plate member, the movement of the traveling head 310 is stopped when the forefront plate member is detected by the sensor 321. Then, it is tried again to insert the projection piece 343. These procedures are repeated by predetermined times when it was not possible to insert the projection piece 343. In some cases, the insertion of the projection piece 343 can accelerate the separation of the forefront plate member from the next plate member.

The apparatus may further comprise a correction means 350 (see FIGS. 15A and 15D) for correcting the position of the traveling head 312 by horizontally moving the traveling head 312 through the moving means 310 by a distance that is equal to difference between a reference thickness of a reference plate member and the actual thickness of the forefront plate member such that the air blower 330 takes a position that enables the air blower 330 to blow air to the boundary between the forefront plate member and the next plate member and such that the projection piece 343 takes a position that enables the projection piece 343 to be inserted into the boundary therebetween. It is possible by the correction means 350 to conduct the positional correction to dispose the projection piece at this position by inputting the actual thickness of the plate members into the controller 304, even if the thickness of the plate members is changed among the production campaigns.

The sensor moving means 360 comprises an actuator 361 that is attached to the traveling head 312 and can swing or move the arm 322 up-and-down to move the sensor 321 to a position above the top surface of the plate members (see FIGS. 15C to 15G). The actuator 361 may a rotary cylinder or direct-acting air cylinder.

The controller (not shown in the drawings) may be connected with the moving means 310, the plate member detecting means 320, the air blower 330, the projection means 340, the correction means 350, and the sensor moving means 360, thereby sending commands for energizing or stopping these. The controller may be disposed at a position away from the traveling head 312.

The plate members 302 may be first ones having entire peripheries with seaming treatment or second ones having chamfered edges. It becomes easier to separate the forefront plate member from the next plate member by using these first and second ones. The plate members 302, however, may be those other than the first and second ones. In this case, it is possible to blow air for a longer period of time to achieve the separation.

The traveling head 312 is designed to be movable along X-axis along the rail 311. Furthermore, it may be designed to be movable along Y-axis that is in horizontal direction perpendicular to the rail 311 and movable along Z-axis that is in vertical direction. With this, it is possible to place the traveling head 312 at an optimum position in accordance with the size of the plate members and the position of the plate members on a pallet.

For example, when the forefront plate member of plate members standing in a pallet etc. is taken with high speed, the next plate member may also be pulled by the forefront glass plate, due to a temporary reduced pressure between these plates. This phenomena "blocking" can easily prevented by the apparatus by blowing air between these plates.

With reference to FIGS. 15A to 15H, an exemplary operation of the apparatus is described in detail, as follows.

As is seen from FIG. 15A, the traveling head 312 is moved toward the forefront plate member 302 of plate members standing in the pallet 303 in a manner to move the sensor 321 closer to the front surface of the forefront plate member.

Figure 15B:
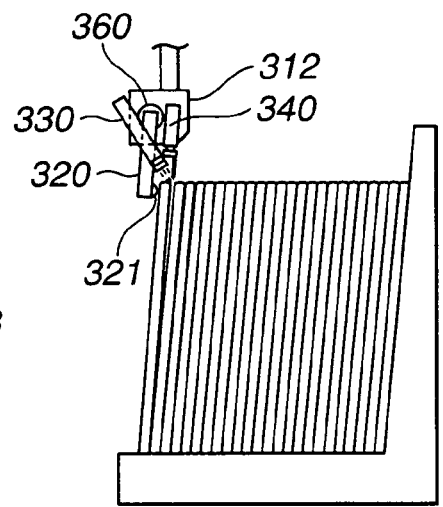

As is seen from FIG. 15B, while the sensor 321 is made to be closer to the front surface of the forefront plate member, air is blown from the air nozzle 331 to the boundary between the forefront plate member and the second plate member to provide a first space therebetween and further to the boundary between the second plate member and the third plate member to provide a second space therebetween. Under this condition, the traveling head is stopped when the sensor 321 detects the front surface of the forefront plate member.

Figure 15C:
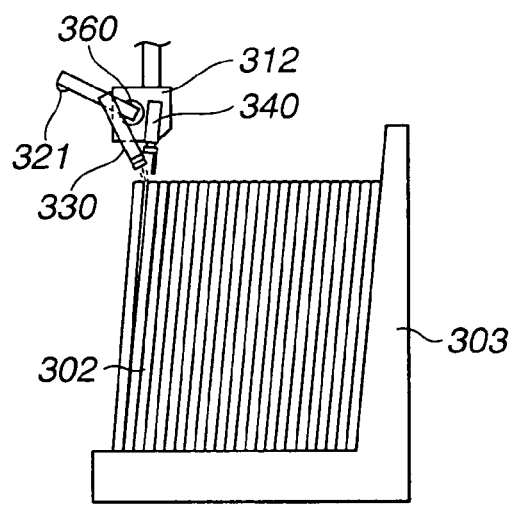

Then, as is seen from FIG. 15C, while the air blow is continued to keep the first and second spaces, the sensor 321 is moved to a position above the top surface of the plate members by swinging the arm 322 upwardly through energizing the actuator 361 of the sensor moving means 360.

Figure 15D:
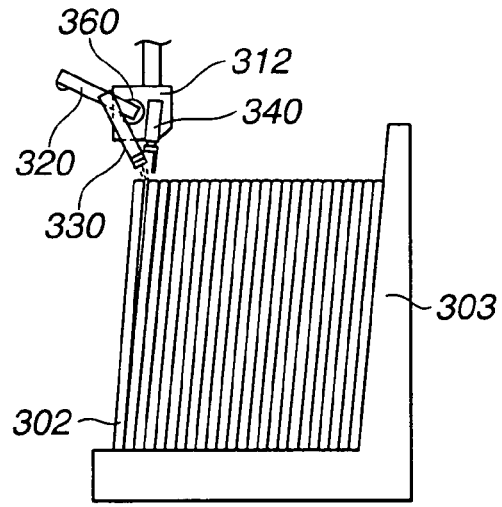

Then, as is seen from FIG. 15D, if necessary, the position of the traveling head 312 is corrected by the correction means 350 by horizontally moving the traveling head by a distance that is equal to a difference between a reference thickness of a reference plate member and the actual thickness of the forefront plate member.

Figure 15E:
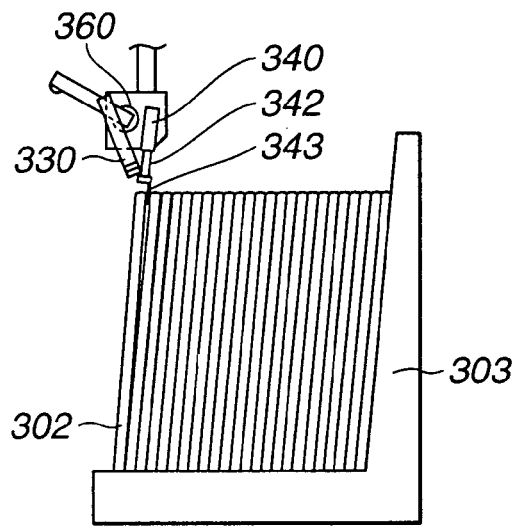

Then, as is seen from FIG. 15E, while the air blow in continued, the projection piece 343 is inserted into the first space by lowering the cylinder 341. When the insertion was successful, it is determined that the forefront plate member is successfully separated from the next plate member. After that, the air blow may be stopped for energy saving under a condition that the projection piece 343 is kept inserted therebetween.

Figure 15F:
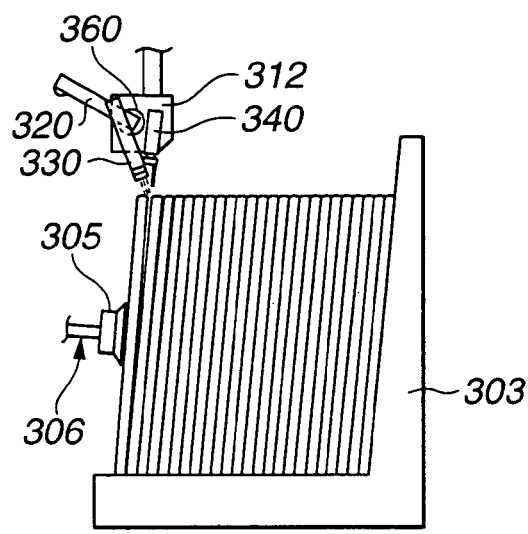

Then, as is seen from FIG. 15F, when a robotic hand 305 of a transfer robot 306 takes a position in the proximity of the forefront plate member, the air blow may be resumed, and then the projection piece 343 is withdrawn upwardly.

Figure 15G:
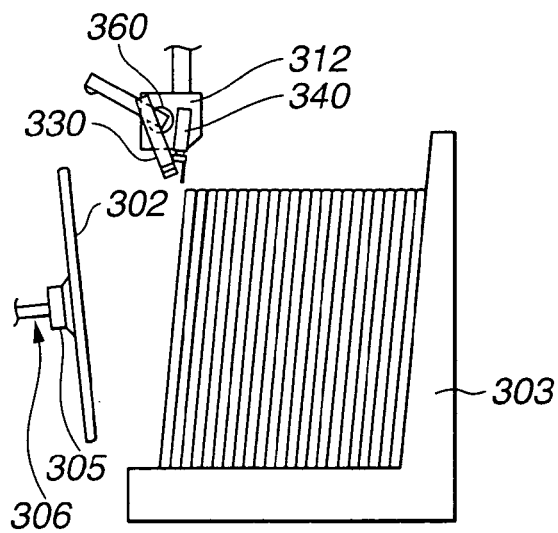

Then, as is seen from FIG. 15G, the air blow is stopped after the forefront plate member is taken by the transfer robot 306.

Figure 15H:
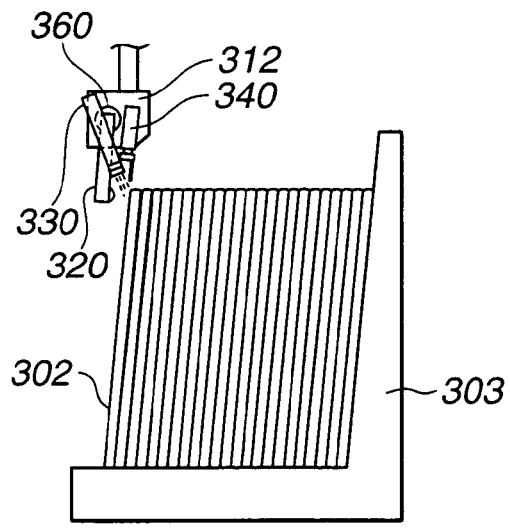

Then, as is seen from FIG. 15H, the traveling head 312 is moved again toward the new forefront plate member (the previous second plate member) to repeat the above-mentioned procedures. In this manner, it is possible to easily transfer the plate members 302 one by one with high speed.

The plate members 302 may be glass plates, resin plates, etc. and may have various shapes (e.g., rectangle, triangle, and trapezoid).

It is optional to stand one or a plurality of lines of plate members on one pallet depending on the size of the plate members.

What is claimed is:

1. An apparatus for putting a glass plate for a vehicle to a target position, comprising:
    (a) an air table for discharging air upwardly such that the glass plate is floated above the air table by an upward force of the air; and
    (b) a robot having a robotic arm mounted with:
        (i) a suction member for supporting the glass plate by applying suction to the suction member, the suction member being movable via the robotic arm to put the glass plate at a preliminary position above the air table when suction is applied to the suction member; and
        (ii) a pressing member that presses against the glass plate with sufficient frictional force between the pressing member and the glass plate to move the glass plate, and that is movable in a horizontal direction via the robotic arm, while the pressing member is in abutment with a top surface of the glass plate, while suction is released from the suction member, and while air is discharged upwardly from the air table such that the glass plate is floated above the air table by the upward force of the air, thereby moving the glass plate in the horizontal direction from the preliminary position above the air table in the target position above the air table by the frictional force generated between the pressing member and the glass plate;
    wherein the apparatus further comprises a conveyance chain, and at least two flights that are attached to the chain, and that are aligned along and move along one side of the air table;
    wherein the pressing member is movable in the horizontal direction to bring an edge of the glass plate into abutment with the at least two flights;
    wherein each flight has play to bring the edge of the glass plate into abutment with each flight; and
    wherein the apparatus further comprises a transfer robot arranged to transfer a first glass plate positioned at a forefront of class plates standing in a pallet, onto a positioning table, by supporting the first glass plate with a suction member of the transfer robot, and a sensor arranged to detect a real coordinate of the first glass plate on the positioning table; and the robot arm is arranged to transfer the first glass plate from the positioning table to the preliminary position above the air table, while a position of the first glass plate is corrected based on a difference between the real coordinate and a reference coordinate of the first glass plate on the positioning table.

2. An apparatus according to claim 1, wherein the pressing member is formed on a bottom surface of the suction member and is made of a sponge rubber.

3. An apparatus according to claim 1, wherein the pressing member is formed in the vicinity of the suction member, and wherein the pressing member has (a) a sponge rubber member to be in abutment with the top surface of the glass plate and (b) a biasing means for downwardly biasing the sponge rubber member against the top surface of the glass plate.

4. An apparatus according to claim 1, wherein the pressing member includes a flat surface which confronts the top surface of the glass plate, which extends along the top surface of the glass plate, and which is arranged to be in surface-to-surface contact with the top surface of the glass plate.

5. An apparatus according to claim 1, wherein a plurality of pressing members are mounted to the robotic arm of the robot.

6. An apparatus according to claim 5, wherein four pressing members are mounted to the robotic arm of the robot.

7. An apparatus according to claim 6, wherein the four pressing members are mounted at four corner portions of a movable plate of the robotic arm.

8. An apparatus according to claim 1, wherein the suction member comprises suction cups.

9. An apparatus according to claim 1, wherein the apparatus further comprises a detection camera arranged to detect the flights.

10. A method for putting a glass plate to a target position, comprising the steps of:
    (a) providing an apparatus according to claim 1;
    (b) putting the glass plate at a preliminary position above the air table by moving the suction member while supporting the glass plate through suction of the suction member;
    (c) releasing suction of the suction member, while air is discharged upwardly from the air table, thereby floating the glass plate at the preliminary position above the air table, and
    (d) moving the pressing member in a horizontal direction, while the pressing member is in abutment with a top surface of the glass plate and while air is discharged upwardly from the air table, thereby moving the glass plate in the horizontal direction from the preliminary position above the air table to the target position above the air table by a frictional force generated between the pressing member and the glass plate.

11. The method according to claim 10, wherein the pressing member is disposed on a bottom surface of the suction member or in the vicinity of the bottom surface of the suction member.

12. The method according to claim 10, wherein the step (c) is conducted at a timing such that at the target position an edge of the glass plate is brought into abutment with at least two positioning guides that are aligned along and move along one side of the air table.

* * * * *

UNITED STATES PATENT AND TRADEMARK OFFICE
CERTIFICATE OF CORRECTION

PATENT NO. : 7,645,111 B2  Page 1 of 1
APPLICATION NO. : 10/876655
DATED : January 12, 2010
INVENTOR(S) : Mori et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Twenty-first Day of December, 2010

David J. Kappos
*Director of the United States Patent and Trademark Office*